Dec. 27, 1932.  H. MOLNER  1,892,492

FRAME

Filed Feb. 12, 1932

INVENTOR
HERMAN MOLNER
Henry Blech
ATTY

Patented Dec. 27, 1932

1,892,492

UNITED STATES PATENT OFFICE

HERMAN MOLNER, OF CHICAGO, ILLINOIS

FRAME

Application filed February 12, 1932. Serial No. 592,598.

The invention relates to frames, and more particularly to frames of the Venetian type.

Frames hitherto employed for pictures, bulletins, and the like required the provision of holes through the glass and/or picture, or alternately nails or tacks were employed to fasten the picture in the rabbet of the frame, there being a paper or cloth backing arranged over the picture to prevent damage thereto.

It, therefore, forms the principal object of the invention to provide a frame where the picture is secured without the necessity of employing nails or tacks or providing holes in the glass and picture or requiring a backing.

A further object aims at providing a frame comprising a plurality of members which when assembled secure a picture or the like in proper position.

A still further object aims at providing a frame having a detachable member capable of securing the picture and the glass against displacement when in functional position.

A further object aims at providing a frame having a detachable member provided with means for engaging the body portion of the frame and with means for securing the picture and the glass against displacement.

It is still a further object to provide certain details of construction and arrangement tending to enhance the desirability and utility of a device of this character.

With these and equally important objects in view which will become apparent from a perusal of the invention, the latter comprises the means described in the following specification, particularly pointed out in the claims forming a part thereof, and illustrated in the accompanying drawing, in which:

Figure 1:
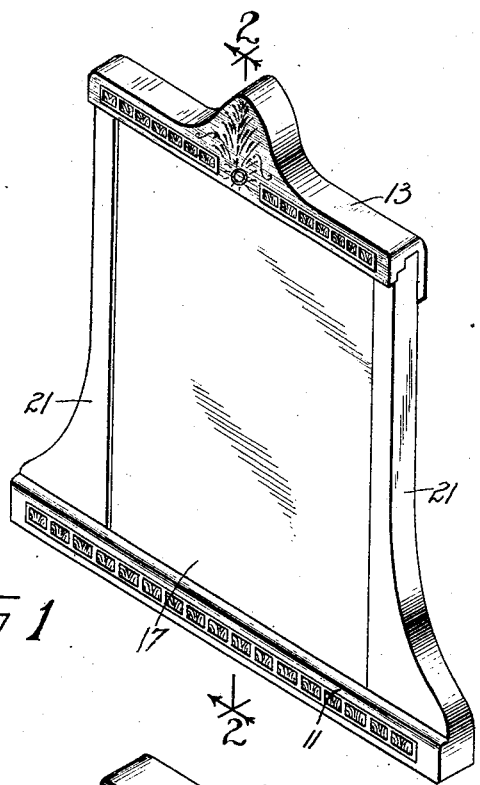
Fig. 1 is a perspective view of the frame constructed in accordance with my invention.
Figure 2:
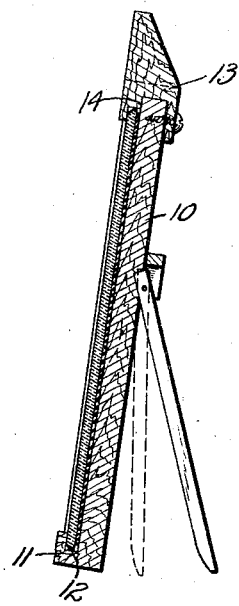
Fig. 2 is a section on the line 2—2 of Fig. 1.

Referring to the several views of the drawing, the frame comprises a body member or back 10 equipped at the lower end with a flange or shoulder 11. The shoulder 11 is provided with a groove 12 originating on top of the shoulder and having the inner wall flush with the forward side of the body member.

The body member is preferably made of veneer but any other material may be used.

A top 13 is provided which is formed with a groove 14 having a deeper portion 15. In assembling the top the groove portion 15 receives the upper end of the back 10 in a snug fit so as to preclude movement of the top on the back.

A picture 16 and a glass 17 extend into the groove 14 and are in contact with a ledge 18 produced by the groove.

The top may be secured to the back by screws 19 passing through a rear ledge 20 of the top into the back. Any other means for securing the top may be employed. Thus the top may be hingedly secured to the back or clamped thereto or any other fastening made or means may be chosen. The sides of the back may be provided with vertical frame members 21.

Figure 3:
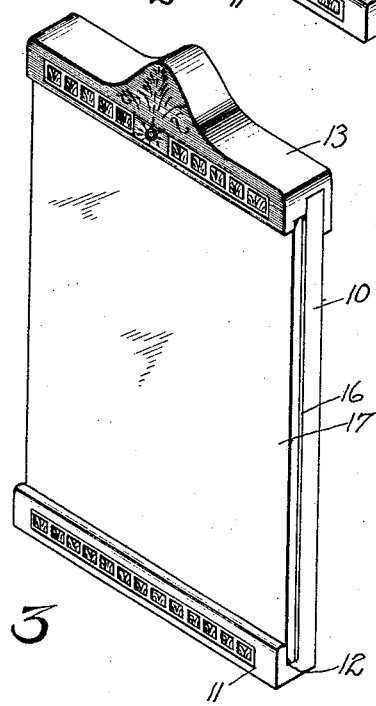
Fig. 3 is a perspective view of a modification.
Figure 4:
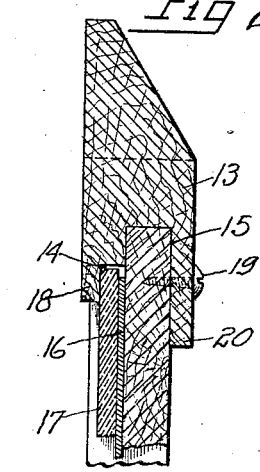
Fig. 4 is an enlarged fragmentary section.

In Fig. 3 a modification is depicted wherein the side members 21 are omitted thus forming a frame known as a Venetian frame.

The picture 16 and the glass 17 are received in the groove 12 and extend substantially to the top of the back. The application of the member 13 completes the frame and at the same time secures the picture and glass against displacement.

The frame may be provided with ornamental composition to enhance its appearance and its form or outline may be varied without departing from the purview of the invention.

The frame shown in the drawing is merely depicted by way of illustration and not by way of limitation.

Nor is its use restricted to pictures but may be employed for bulletin boards, tables, and in general for any purpose possible.

I, therefore, do not limit myself to the particular style of frame nor to the particular construction shown but wish to include all such changes, variations, modifications or alterations constituting departures within the scope of the invention, as defined in the appended claims.

I claim:

1. A frame for the purpose described including a flat rigid back member having a forwardly projecting flange at its lower edge, said flange having a groove in its upper face extending from side to side of the back and having its rear wall coplanar with the front face of the back member, and a cap member extending along the top of the back member and having a groove therein to receive the upper edge of said back member, the front wall of said groove having a rabbet formed at its inner corner confronting the groove in said flange, the rear wall of the groove in the cap projecting below the front wall, and screws passing through the rear wall into said back member to hold the cap removably on the back member.

2. A frame for the purpose described including a flat rigid back member having a forwardly projecting flange at its lower edge, said flange having a groove in its upper face extending from side to side of the back and having its rear wall coplanar with the front face of the back member, and a cap member extending along the top of the back member and having a groove therein to receive the upper edge of said back member, the front wall of said groove having a rabbet formed at its inner corner confronting the groove in said flange, the rear wall of the groove in the cap projecting below the front wall, and side members carried by the back and projecting up from the end portions of said flange, said side members having their upper ends conforming to and fitting the groove and rabbet of the cap.

In witness whereof I affix my signature.

HERMAN MOLNER.